United States Patent
Nishiyama et al.

(10) Patent No.: US 6,509,665 B1
(45) Date of Patent: Jan. 21, 2003

(54) MOTOR HAVING STATOR WITH INSULATOR OF HIGH HEAT-CONDUCTIVITY

(75) Inventors: Noriyoshi Nishiyama, Izumiotsu (JP); Yasufumi Ikkai, Kobe (JP)

(73) Assignee: Matsushita Electric Industial Co., Ltd. (JP)

(*) Notice: Subject to any disclaimer, the term of this patent is extended or adjusted under 35 U.S.C. 154(b) by 4 days.

(21) Appl. No.: 09/687,732

(22) Filed: Oct. 13, 2000

(30) Foreign Application Priority Data

Oct. 25, 1999  (JP) .......................... 11-302141
Oct. 29, 1999  (JP) .......................... 11-309315

(51) Int. Cl.⁷ ............................................. H02K 15/00
(52) U.S. Cl. ...................................... 310/215; 310/194
(58) Field of Search .......................... 310/43, 64, 194, 310/215, 45, 254, 216; 29/596–598; 264/272.13, 272.2; 428/218, 328, 329, 404, 416, 473.5, 480, 514, 698, 7.2

(56) References Cited

U.S. PATENT DOCUMENTS

| | | | |
|---|---|---|---|
| 4,624,884 A | * 11/1986 | Harada et al. | 428/218 |
| 5,076,585 A | * 12/1991 | Bouquet | 473/343 |
| 5,698,923 A | * 12/1997 | Scherzinger et al. | 310/194 |
| 5,786,651 A | * 7/1998 | Suzuki | 310/259 |
| 5,949,171 A | * 9/1999 | Horski et al. | 310/216 |
| 6,069,430 A | * 5/2000 | Tsunoda et al. | 310/180 |
| 6,127,753 A | * 10/2000 | Yamazaki et al. | 310/194 |
| 6,147,580 A | * 11/2000 | Rettew et al. | 336/60 |
| 6,194,665 B1 | * 2/2001 | Kuribayashi et al. | 174/120 R |

* cited by examiner

Primary Examiner—Tran Nguyen
(74) Attorney, Agent, or Firm—Rossi & Associates

(57) ABSTRACT

A motor has a stator formed by assembling stator members in an annular shape. The stator member includes a core segment formed of laminated electromagnetic steel sheets, an electrical insulator covering the core segment, and a coil wound on a tooth of the core segment via the insulator. At least parts of the insulator contacting the coil is made of highly heat-conductive insulating resin. A motor has a stator iron core formed of laminated electromagnetic steel sheets, and the motor includes a highly heat-conductive insulating sheet disposed on the laminated face of a slot of the stator iron core and a coil wound in a slot via the sheet. These structures allow the heat generated by the coil to travel to the core segment with ease, because of the resin or the sheet disposed between the core segment and the coil, thereby cooling the motor efficiently. As a result, a continuous output rating is improved, and a highly efficient motor with long service life, free from shortening its service life due to the heat, can be realized.

4 Claims, 11 Drawing Sheets

MOTOR HAVING STATOR WITH INSULATOR OF HIGH HEAT-CONDUCTIVITY

FIELD OF THE INVENTION

The present invention relates to a motor having a stator with an insulator. More particularly, it relates to a motor that can dissipate efficiently the heat from a coil section by accommodating at least parts of an insulator with high heat-conductivity.

BACKGROUND OF THE INVENTION

Two types of stator have been available in motors or generators depending on ways of winding wires, i.e. one is a distributed coil stator and the other is a concentrated coil stator. The distributed coil stator is this: Wire is wound to stride over at least two slots, where a plurality of slots are formed between teeth, in other words, parts of coil of different phase exists in one coil pitch. On the other hand, the concentrated coil stator is this: Wire is wound on one tooth concentrically in one single phase. This stator can advantageously shorten a coil end, thereby downsizing the motor. The reduced wire-wound-resistor of this stator also reduces copper loss generated by wire-wound-current and wire-wound-resistor. This also advantageously produces high efficiency.

A synchronous motor, different from an inductance motor in which a rotor incurs secondary copper loss, dissipates efficiently the heat from stator coils, so that a rated output can be increased. As a result, the synchronous motor achieves high efficiency and a long service life free from adverse influence by heat.

Several cooling methods have been available; dissipating fins on a frame arranged around the stator rim to cool substantially the surface area, a forced cooling system by fan, a liquid cooling system through a cooling-liquid-path provided to a frame. Other cooling systems are also available, e.g. cooling directly the core coils in a motor with oil, dissipating the heat inside a motor through a heat-pipe to outside. However, since these methods cool directly the inside of motor, a number of components inevitably increases, which makes the motor-structure complicated, and thus produces another problem such as maintaining the reliability.

The coil—a heat source—is electrically insulated on its surface so that the coil can carry electric current. An insulator or an insulating paper is disposed between the coil and an iron core made of electromagnetic steel sheets in order to prevent the coil from being peeled off its sheath or broken by the edges of the iron core when the wires are coiled. The insulating paper, in general, uses aramid paper. The discussion above describes general structures of the motor-coil.

These insulator and insulating paper are electrical insulating material and at the same time, they are heat insulators and thus block heat conduction. For instance, the aramid paper's heat conductivity is as low as ca. 0.14W/mK.

An instance is available where highly heat-conductive resin is disposed between the coil and frame to dissipate efficiently the heat from the motor. Indeed, this arrangement increases heat-dissipation-efficiency, but it also increases the motor's weight. This becomes a critical problem particularly in the motor for an electric-vehicle, because this motor needs to be downsized and demands a greater output at higher efficiency. Further, this arrangement requires equipment and process for potting the resin, and reliability should be reserved in order to avoid shorting due to electrical breakdown of coils depending on the pressure or temperature at the resin potting.

If the material of an insulator is changed to the higher heat-conductive material, the following problem is revealed: In a process of winding a wire on a core, the wire needs some tension, otherwise, the wire becomes loose, and the wire could not be wound correctly within a slot. The insulator has strength bearable at least this tension. On the other hand, an electrical insulator of high heat conductivity—silicone rubber or synthetic resin containing aluminum oxide of excellent heat-conductivity is well known—is soft and fragile and thus has poor strength not to be an insulator for the coil.

SUMMARY OF THE INVENTION

The present invention addresses the problems discussed above and aims to provide a motor that can dissipate the heat generated by a coil.

The motor of the present invention includes a stator formed by combining stator members in an annular shape. The stator members comprise the following elements:

(a) a core segment formed of laminated electromagnetic steel sheets;

(b) an electrical insulator covering the core segment; and (c) a coil wound on a tooth of the core segment via the insulator. At least a part of the insulator touching at the coil is an insulating resin of high heat-conductivity.

Since a part of the insulator is highly heat-conductive, material of the other parts of the insulator can be selected arbitrarily. Thus the insulator can be strengthened while it increases the heat conductivity between the core segment and the coil.

Another motor of the present invention includes stator iron core formed of laminated electromagnetic steel sheets, and this motor comprises the following elements:

a sheet of highly heat-conductive insulator disposed on the laminated-face of the slot of the stator iron core; and coils wound in slots via the sheet of highly heat-conductive insulator.

This structure disposes the sheet of highly heat-conductive insulator between the stator iron core and the coils, so that the heat from the coils travels to the stator iron core with ease. As a result, the motor can dissipate efficiently the heat.

DETAILED DESCRIPTION OF THE EXEMPLARY EMBODIMENTS

Exemplary embodiments of the present invention are demonstrated hereinafter with reference to the accompanying drawings.

(First Exemplary Embodiment)

Figure 1:
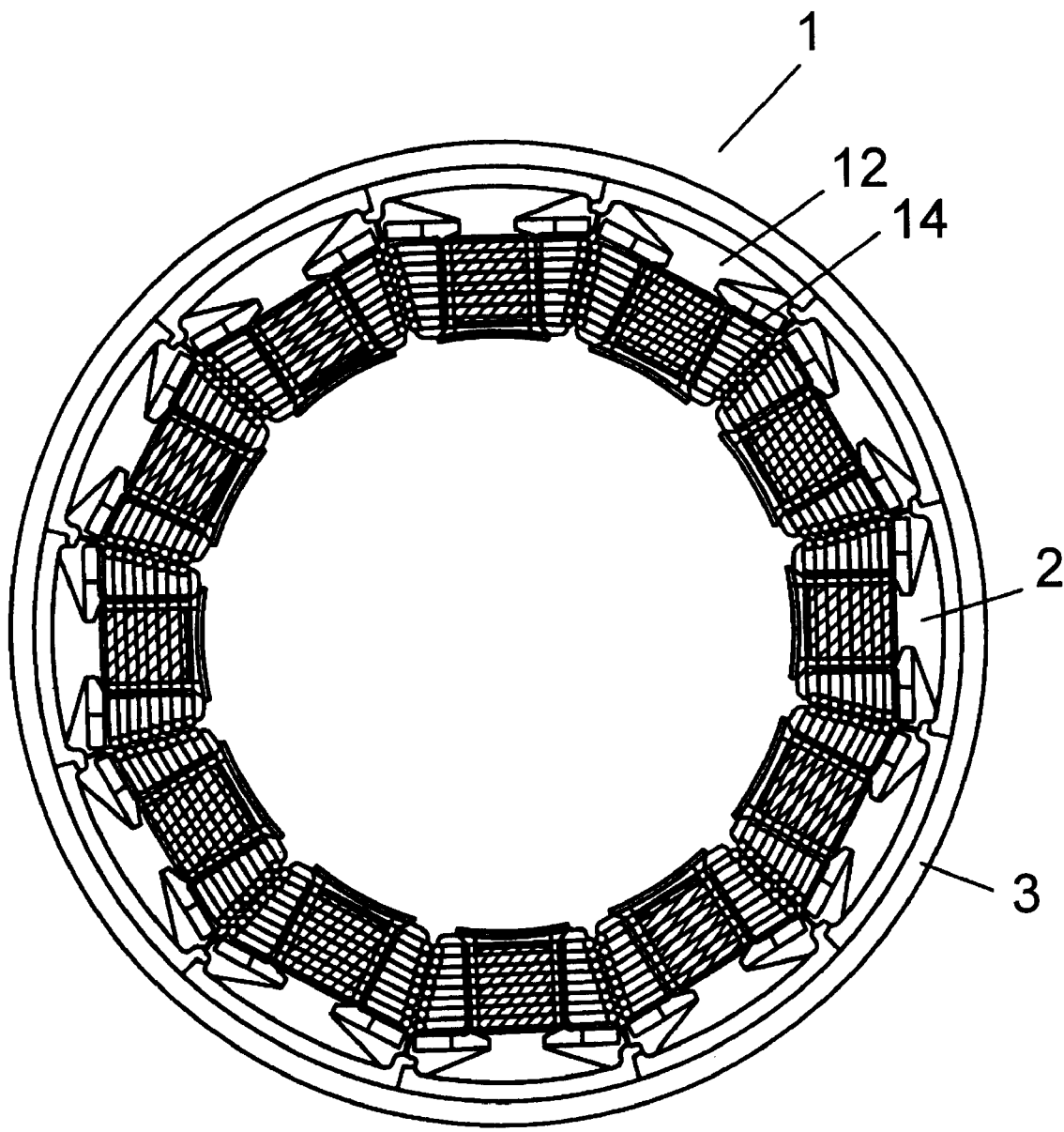
FIG. 1 is a plan view of a stator in accordance with a first exemplary embodiment of the present invention.
Figure 2:
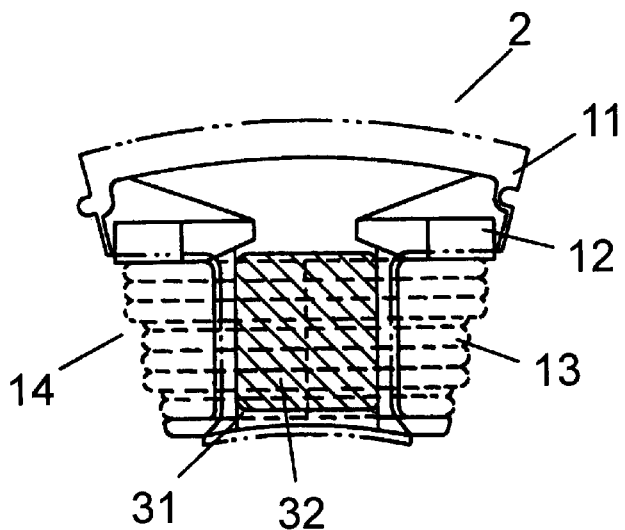
FIG. 2 illustrates members constructing the same stator shown in FIG. 1.
Figure 3:
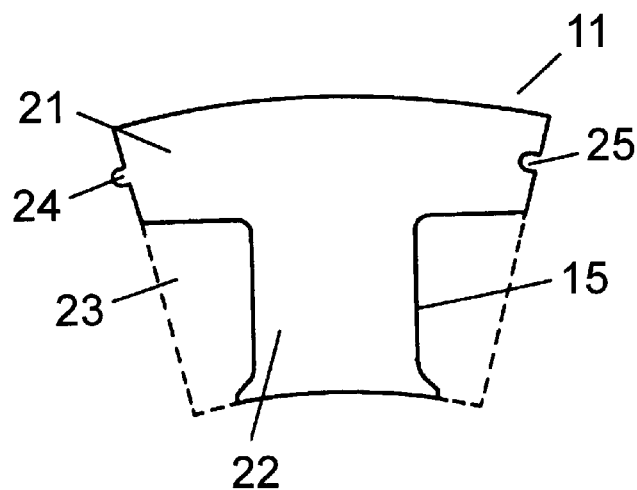
FIG. 3 shows a core segment of the stator members shown in FIG. 2.
Figure 4:
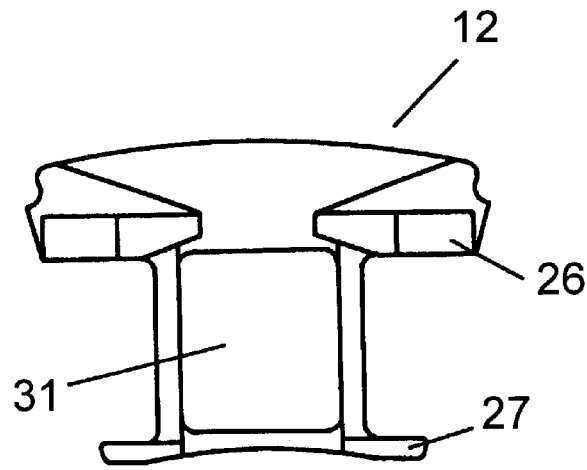
FIG. 4 shows an insulator of the stator members shown in FIG. 2.
Figure 5:
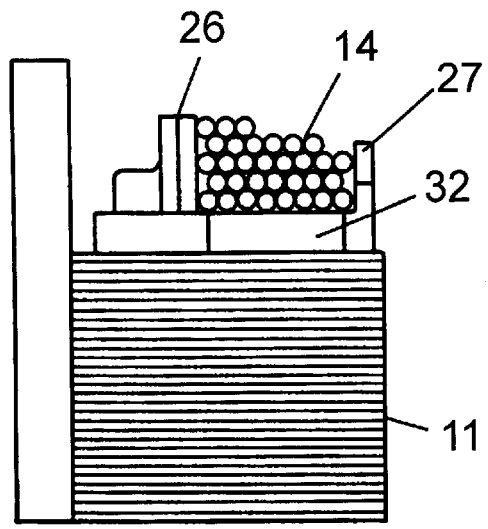
FIG. 5 is an upper cross section of the stator members shown in FIG. 2.

FIG. 1 is a plan view of a stator in accordance with the first exemplary embodiment of the present invention. FIG. 2 illustrates members constructing the same stator. FIG. 3 shows a core segment of the stator members. FIG. 4 shows an insulator of the stator members. FIG. 5 is an upper cross section of the stator members.

In FIG. 1, stator 1 is formed by assembling a plurality of stator members 2 in an annular shape, then covering the annular shape, with ring supporter 3 in order to reinforce the annular shape. Stator 1 employs a concentrated winding method. A rotor having permanent magnets is disposed in stator 1 to form a synchronous motor with permanent magnets. Coil 14 is transparently illustrated to reveal an end face of insulator 12 beneath coil 14.

The stator members are detailed hereinafter with reference to FIG. 2.

Stator member 2 is formed by (a) covering core-segment 11 made of laminated electromagnetic steel sheets with insulator 12, (b) disposing highly heat-conductive insulating resin 32 at hole 31 of insulator 12, and (c) coil 14 formed by winding wire 13 sheathed by insulating material on insulator 12 and resin 32.

Core segment 11 includes yoke 21 and tooth 22 as shown in FIG. 3. The difference in widths between yoke 21 (length of outer wall) and tooth 22 forms space, i.e. slot 23. Both the end faces of yoke 21 have protrusion 24 or recess 25, and they engage with a recess or protrusion of the adjacent core segment so that a plurality of core segments 11 connect with each other and form an annular shape.

As shown in FIG. 4, insulator 12 made of electrically insulating resin prevents coil 14 from shorting with core segment 11 when tooth 22 of core segment 11 is wound by the winding. Tooth 22 is inserted into guide sections (protruded section toward the core segment), so that insulator 12 is positioned with respect to tooth 22. As shown in FIG. 5, coil supporters 26 and 27 are protruded along the laminated sheets of electromagnetic steel, so that they function as guides for assuring the coil being wound on tooth 22. Insulator 12 has hole 31 through which a part of tooth 22 is exposed when insulator 12 is mounted to core segment 11. Insulator 12 must cover edge 15 of core segment 11, and hole 31 is desirably placed at the center of core segment 11 excluding edge 15.

FIG. 5 is an upper cross section illustrating the stator member. The lower cross section would show the same construction. As such, the stator member desirably has the same construction both in upper and lower sides; however, the lower side may not have hole 31 and resin 32.

If a wire is wound directly on the core segment, edge 15 would peel the sheath off the wire. Insulator 12 made of insulating resin thus protects the surrounding of core segment 11. When the insulating resin protects core segment 11, if the resin made of highly heat-conductive insulating resin is used, edge 15 would damage the wire because the resin is soft. Therefore, the section corresponding to edge 15 is preferably formed; by hard insulating resin harder than the highly heat-conductive insulating resin.

Stator member 2 is structured as discussed above, and coil supporters 26 and 27 are wound on insulator 12 as well as highly heat-conductive insulating resin 32 by the wire to be wound so that resin 32 is urged and adhered to core segment 11. In other words, parts of wire are adhered to core segment 11 via resin 32, the heat from the wire-wound travels to core segment 11 with ease.

Further, since insulator 12 is formed of hard-insulating-resin at the section corresponding to edge 15, the winding on insulator is not damaged by edge 15.

A plurality of stator members 2, comprising coil 14 on core segment 11 via insulator 12, are coupled with each other to form an annular shape. At least parts of the outer walls between the adjacent stator members are soldered for reinforcing the coupling. Ring supporter 3 is shrunk or inserted to cover the annular-shaped stator members 2, so that stator 1 is assembled into a strong integrated unit.

The features of the stator. are summarized as follows: the insulator used in this first embodiment protects the stator and particularly protects the section corresponding to edge 15 by hard-insulating-resin harder than highly heat-conductive insulating resin 32 that protects the other sections of the stator. The heat from coil, 14 effectively travels to core segment 11, and the insulating section corresponding to edge 15 is not cracked by tension in winding the wire, yet it does not damage coil 14 at edge 15.

The hard insulating resin is made of polyphenylene sulfide (PPS) of which tensile strength is 165 Mpa and heat conductivity is 0.3 W/mK. Highly heat-conductive insulating resin 32 is made of silicone rubber of which tensile strength is 3.7 Mpa and heat conductivity is 5 W/mK. The hard insulating resin can be made of other materials than PPS; however, they desirably have tensile strength not less than 40 Mpa. In an experiment, hard insulating resin less than 40 Mpa experiences breakage due to tension of wire when; it is wound by the winding machine by the force of 50N. Therefore, the hard insulating resin needs tensile strength of not less than 40 Mpa. The highly heat-conductive insulating resin 32 may include aluminum oxide which is an electrical insulator and yet has excellent heat-conductivity.

Ring supporter 3 is not necessarily shaped in a ring but it may be any w frame shaped in an arbitrary form as far as it can reinforce from their outer wall the annular shaped stator-members. Air-cooling or liquid-cooling of the frame without cooling directly inside the motor allows the motor not to increase the weight and dissipate the heat efficiently in a simple structure. As a result, this structure can provide a stator with concentrated winding, which increases the output rating and achieves a long service life of high-performance motor.

(Second Exemplary Embodiment)

Figure 6:
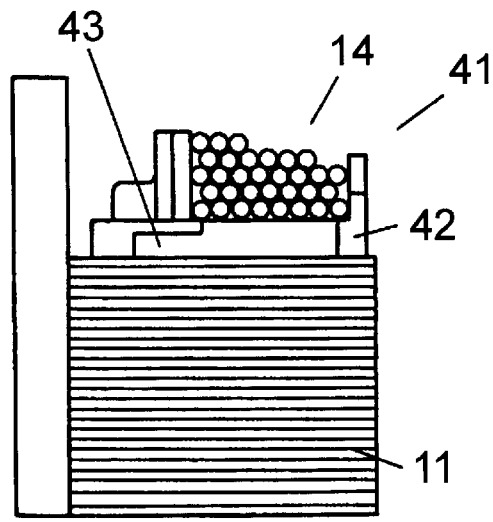
FIG. 6 is an upper cross section illustrating members constructing a stator in accordance with a second exemplary embodiment of the present invention.

FIG. 6 is an upper cross section illustrating members constructing a stator in accordance with the second exemplary embodiment of the present invention.

In FIG. 6, insulator 42 covering core segment 11 has a hole. The shape of the hole looks like the hole of the first embodiment; however, the hole of this second embodiment has a step. This is a different point from that of the first embodiment. When highly heat-conductive insulating resin 43 has approx. the same step, and this resin 43 is used in the second embodiment, not only the winding but insulator 42 urges resin 43 against core segment 11. This structure allows resin 43 to contact with core segment 11 firmly. If this step is eliminated and the hole is wider than the width of the coil section, a part of resin 43 floats up from a place where the winding does not cover, although resin 43 tries to contact with core segment 11 by coil's tension. As a result, it may happen that resin 43 cannot completely contact with core segment 11. As shown in FIG. 6, the area on the side of core segment 11 of resin 43 is greater than that on coil 14 side, so that the heat generated by coil 14 is absorbed by core segment 11 with ease, and the heat conductive efficiency is improved.

(Third Exemplary Embodiment)

Figure 7:
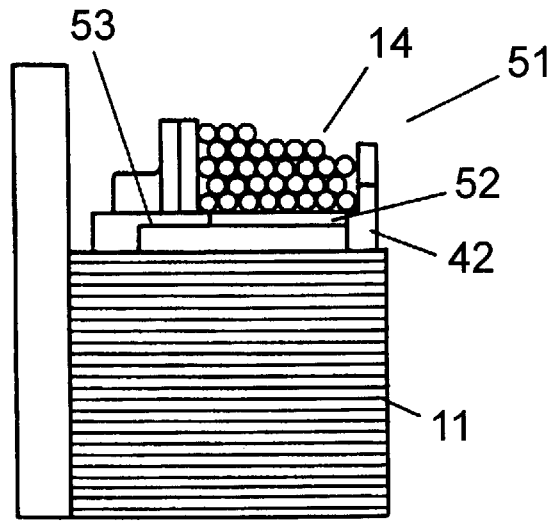
FIG. 7 is an upper cross section illustrating members constructing a stator in accordance with a third exemplary embodiment of the present invention.

FIG. 7 is an upper cross section illustrating members constructing a stator in accordance with the third exemplary embodiment of the present invention.

In FIG. 7, insulator 42 covering core segment 11 has a hole. The shape of this hole is the same as that used in the first embodiment; however, the hole of this third embodiment differs from that of the first embodiment in including highly heat-conductive insulating resin 52 and high heat-conductor 53 therein. High heat-conductor 53 features the better heat conductivity than the hard insulating resin of insulator 42 regardless of electric insulating. Thus metal and the like can be conductor 53. For instance, high heat-conductor 53, represented by electromagnetic steel sheet, is provided in the hole of insulator 42 particularly at the section contacting to core segment 11, and highly heat-conductive insulating resin 52 is disposed between coil 14 and high heat-conductor 53, thereby urging resin 52 against conductor 53 with the winding. This structure urges firmly resin 52 against conductor 53.

Metal of higher heat-conductive rate by one digit is added to resin, thereby further improving the heat dissipating efficiency In particular, when a thickness of the insulator is not less than 2 mm, more remarkable improvement can be expected.

High heat-conductor 53 is desirably non-magnetic metal with high electric resistance such as aluminum, copper, austenite system stainless steel, or laminated insulating sheets using e.g. magnetic steel sheets. When a lump of magnetic metal having a large cross section area is used, the current carried by the winding produces eddy current, which may increase heat generation. High heat-conductor 53 can be insert-molded into the insulator, whereby a number of components can be reduced as well as efficiency of assembly can be improved. Further, highly heat-conductive insulating resin 52 is unitarily molded in the insulator, the number of components can be reduced and the efficiency of assembly can be also improved. These advantages are applicable to the first through third embodiments.

Heat-conductive resin, e.g. paste-like liquid rubber is applied to core segment 11 in order to increase the degree of contact between core segment 11 and high heat-conductor 53. In other words, it is preferable to dispose heat-conductive resin between core segment 11 and conductor 53. In addition, heat-conductive resin may be disposed between highly heat-conductive insulating resin 52 and core segment 11.

(Fourth Exemplary Embodiment)

Figure 8:
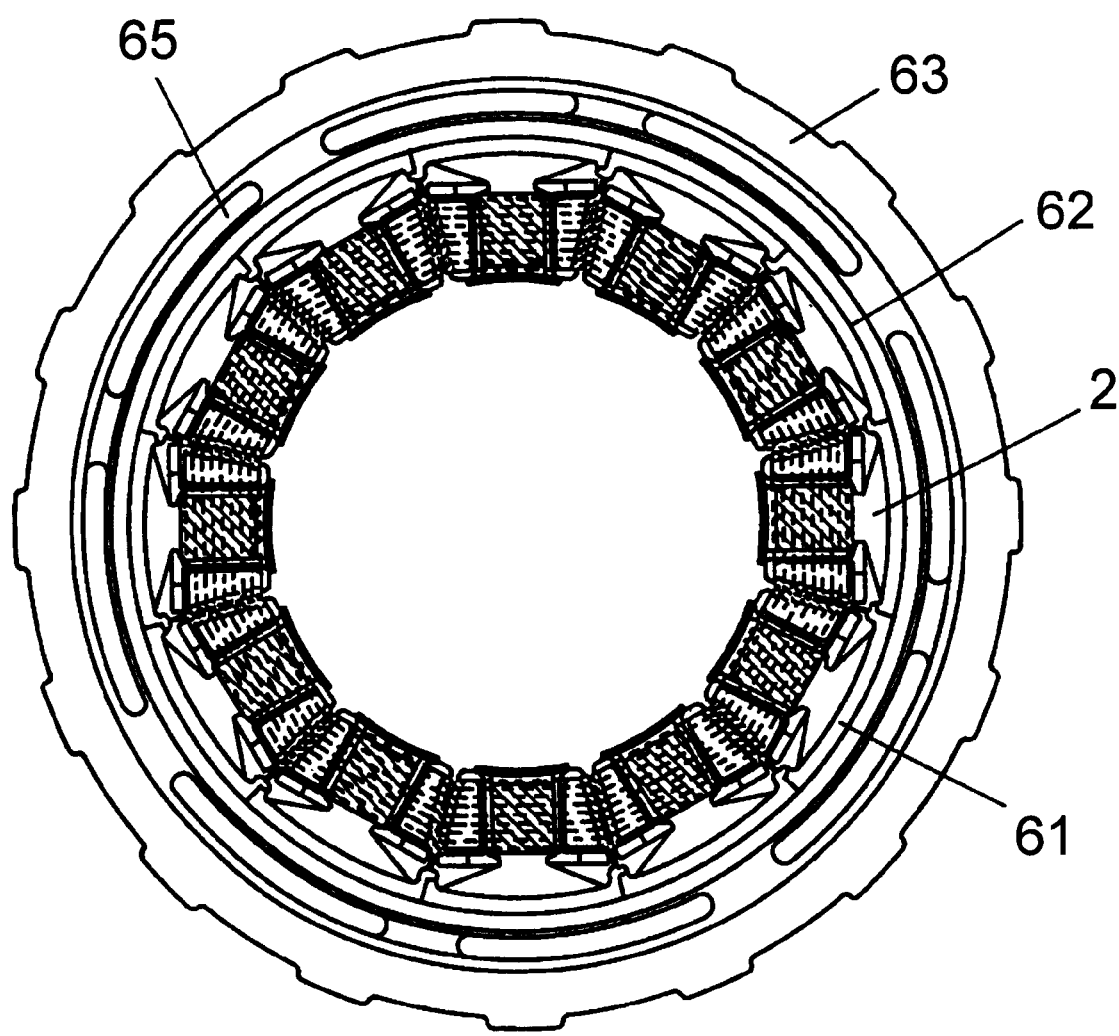
FIG. 8 is a plan view of a stator in accordance with a fourth exemplary embodiment of the present invention.
Figure 9:
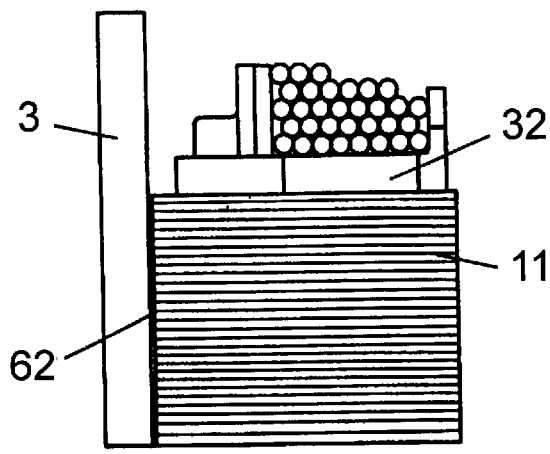
FIG. 9 is an upper cross section illustrating members constructing the stator shown in FIG. 8.
Figure 10:
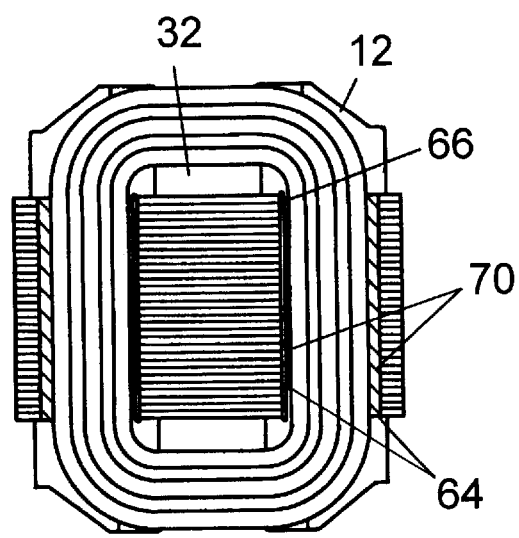
FIG. 10 shows the stator members shown in FIG. 8 viewed from the teeth side.
Figure 11:
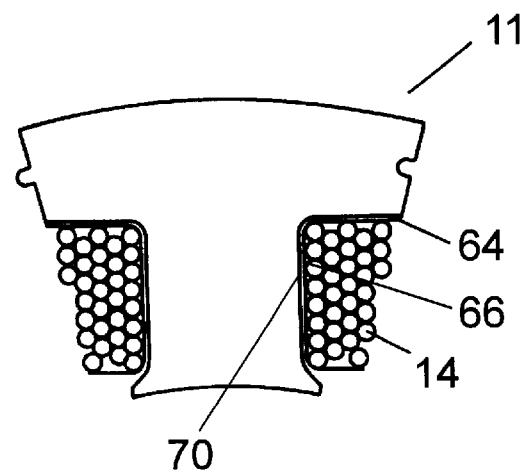
FIG. 11 shows a core segment provided with a sheet made of heat conductive resin.
Figure 12:
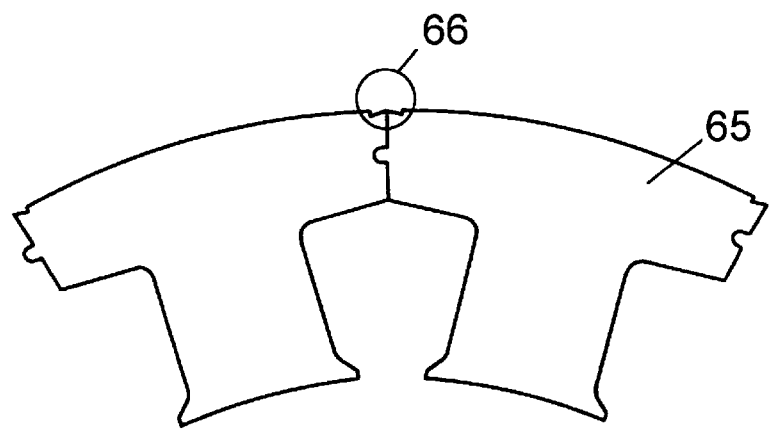
FIG. 12 shows a core segment.
Figure 13A:
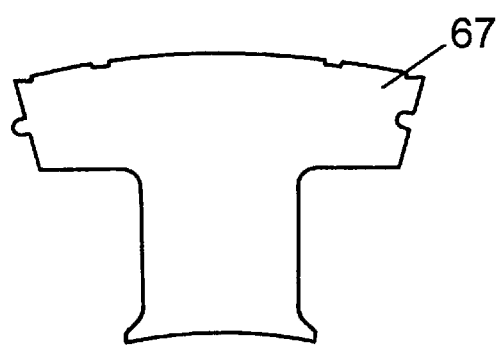
FIG. 13A and FIG. 13B show a sheet of electromagnetic steel sheet constructing the core segment.
Figure 13B:
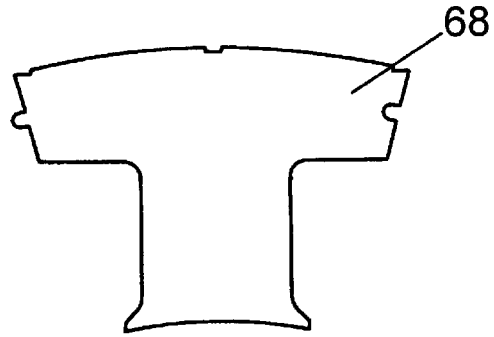
Figure 14:
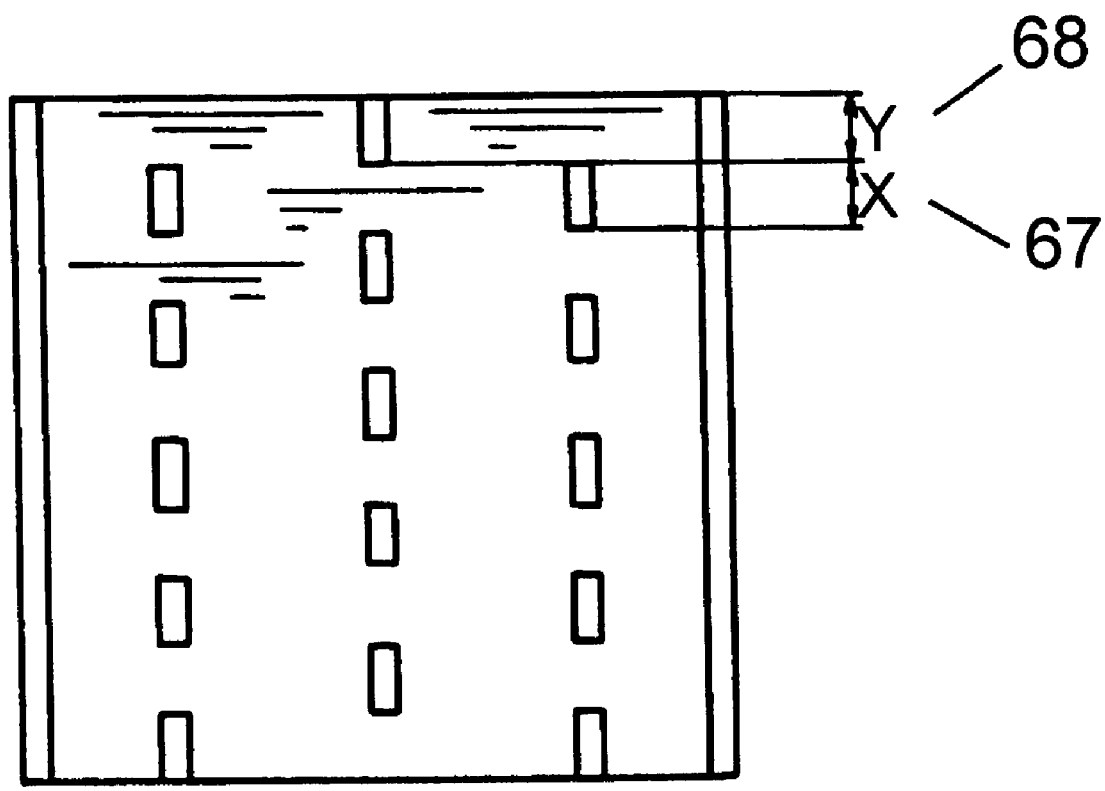
FIG. 14 shows an outer wall of the core segment.

FIG. 8 is a plan view of a stator in accordance with the fourth exemplary embodiment of the present invention. FIG. 9 is an upper cross section illustrating members constructing the stator shown in FIG. 8. FIG. 10 shows the stator members shown in FIG. 8 viewed from the teeth side. FIG. 11 shows a core segment provided with a sheet made of heat conductive resin. FIG. 12 shows a core segment. FIG. 13A and FIG. 13B show a sheet of electromagnetic steel constructing the core segment. FIG. 14 shows an outer wall of the core segment.

In FIG. 8, after stator members 2 are assembled into an annular shape, stator 61 is reinforced by motor frame 63 from outside. At this time, heat-conductive resin 62 is disposed between frame 63 and stator members 2. Resin 62 is preferably an insulator; but it may as well be conductor. For instance, resin 62 is grease-like rubber functioning as grease at a room temperature. This resin is applied to the outer wall of annularly assembled stator members 2, then frame 63 is fitted thereon. As such, resin 62 is disposed between stator members 2 and frame 63, so that the heat from stator members 2 travels to frame 63 with ease. As a result, heat dissipation of stator 61 is improved. Frame 63 is equipped with circulatory path 65 which carries cooling liquid or cooling gas, and this structure air-cools or liquid-cools the frame, outside the motor without, cooling directly inside the motor. This structure allows the motor not to increase the weight and dissipate the heat efficiently in a simple structure. As a result, this structure can provide a stator with concentrated winding, which increases the output rating and achieves a long service life of high-performance motor.

Further in stator members 2 in accordance with the fourth embodiment, heat-conductive insulating sheet 64 covers laminated faces 70 of the slots of core segment 11 as shown in FIGS. 10 and 11. Sheet 64 contacts with laminated faces 70, and when insulator 12 fits to core segment 11, sheet 64 is arranged to exist between laminated faces 70 and guide sections 66 of insulator 12. Then wire is wound on insulator 12, thereby forming coil 14. Coil 14 contacts with core segment 11 via highly heat-conductive insulating resin 32 as well as sheet 64, so that the heat generated by coil 14 can travels to core segment 11 with ease.

Further, in the structure in accordance with the fourth embodiment, heat-conductive resin 62 is disposed between core segment 11 and motor frame 63, so that the heat generated by coil 14 also travels to core segment 11 with ease. In addition to this, the heat from core segment 11 travels to frame 63 with ease. In other words, the heat generated by coil 14 travels to frame 63 via resin 62 with ease, and this improve the heat dissipation of the stator. As shown in FIG. 12, recess 66 is formed at the end of outer wall of core segment 65, then resin 62 is applied to the outer wall including recess 66. This structure allows resin 62 to adhere easily to the outer wall. Electromagnetic steel sheets 67 and 68 shown in FIG. 13A and 13B respectively are laminated to depth X and Y. These laminated units are alternately piled up in 10 units to form a core segment as shown in FIG. 14. The outer wall of the, core segment has grooves discontinuously in the laminating direction. This structure is thus easy for heat conductive resin 62 to be applied to the outer wall. When the frame is press fitted or shrunk to fit to the outer wall of the stator core, this structure prevents resin 62 from rubbing off, and resin 62 remains at least in grooves so that it contributes to improving the heat conductivity.

(Fifth Exemplary Embodiment)

Figure 15:
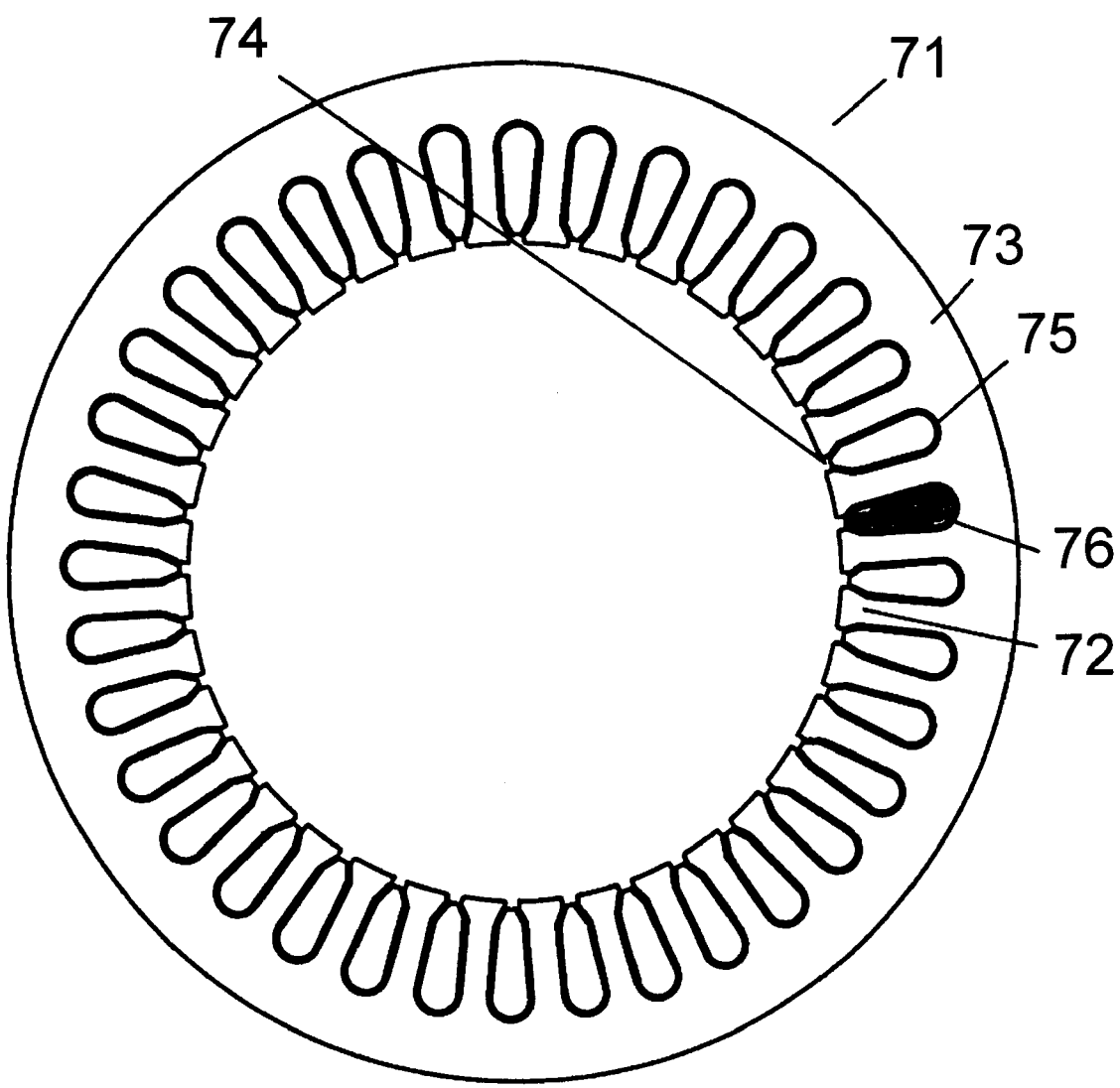
FIG. 15 is a cross section illustrating a stator in accordance with a fifth exemplary embodiment of the present invention.
Figure 16:
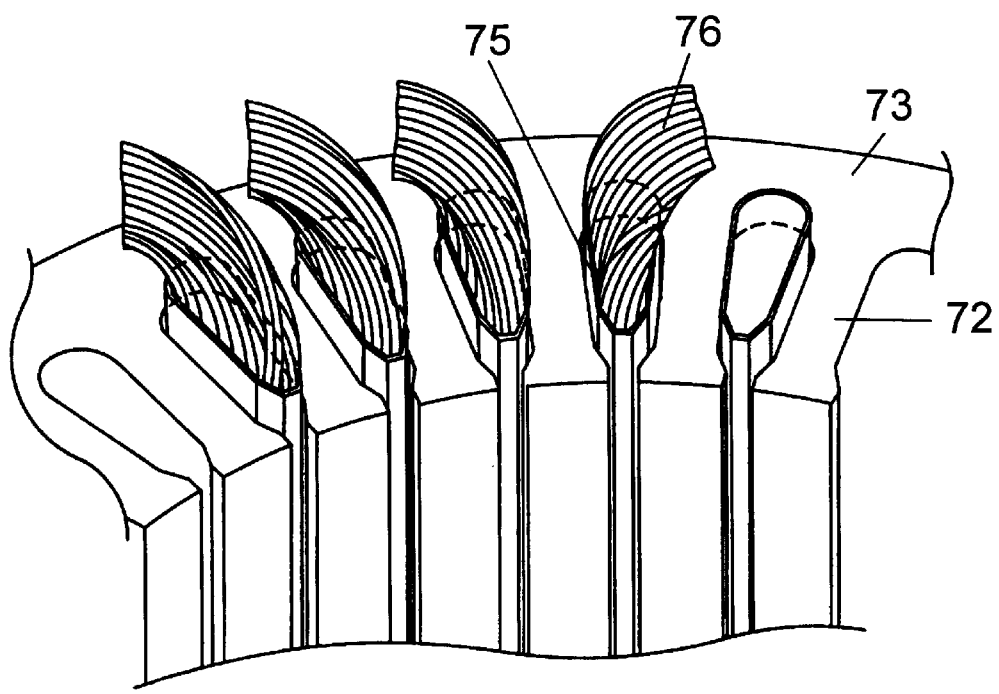
FIG. 16 shows an end face of the stator shown in FIG. 15.
Figure 17:
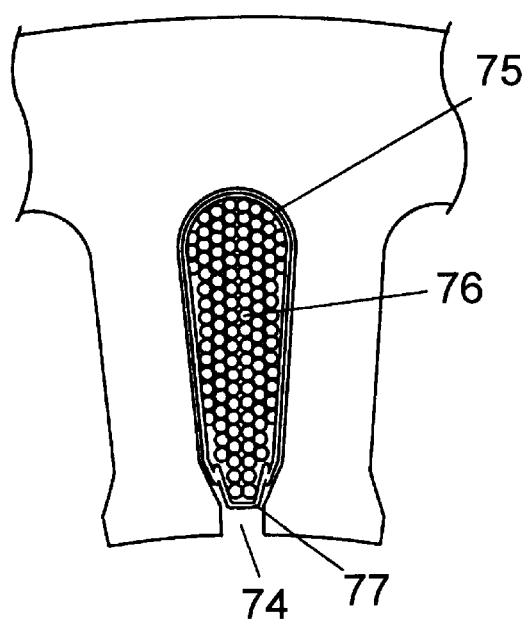
FIG. 17 is an enlarged essential part of the stator shown in FIG. 15.

FIG. 15 is a cross section illustrating a stator in accordance with the fifth exemplary embodiment of the present invention. FIG. 16 shows an end face of the stator. FIG. 17 is an enlarged essential part of the stator.

In FIG. 15, stator 71 is formed of laminated electromagnetic steel sheets. Stator 71 comprises the following elements: (a) stator body 73 having a plurality of teeth, (b) highly heat-conductive insulating sheet 75 disposed on a side of the lamination of slot 74 of stator body 73, and (c) coil 76 formed of distributed windings in slot 74 with sheet 75 in between.

FIG. 16 illustrates a proximity to an end face of stator 71. Sheet 75 is disposed between coil 76 and teeth 72, and protrudes a little bit higher than the end face of stator body 73, thereby covering a part of coil 76. This structure allows sheet 75 to protect coil 76 even coil 76 is bent at the edge of stator body 73, so that coil 76 is not damaged by the edge of stator body 73.

Stator body 73 adheres to coil 76 with sheet 75 in between, and since sheet 75 is an insulator, it does not carry electric current from coil 6 to stator body 73 even if the sheath of coil 76 is peeled off. Further, sheet 75 is highly heat-conductive, and the heat generated by coil 76 travels to stator body 73 with ease. As a result, the motor has advantageously excellent heat dissipation.

FIG. 16 shows sheet 75 as a pipe (open-end); however, it may be closed, except for a path for coil 76. As shown in FIG. 17, another insulating sheet 77 may hold coil 76 to prevent coil 76 from sticking out from the opening of slot 74.

A rotor to be inserted into stator 71 may be a rotor with permanent magnets, a rotor for a reluctance motor without permanent magnets, or a cage-type rotor for an inductance motor.

(Sixth Exemplary Embodiment)

Figure 18:
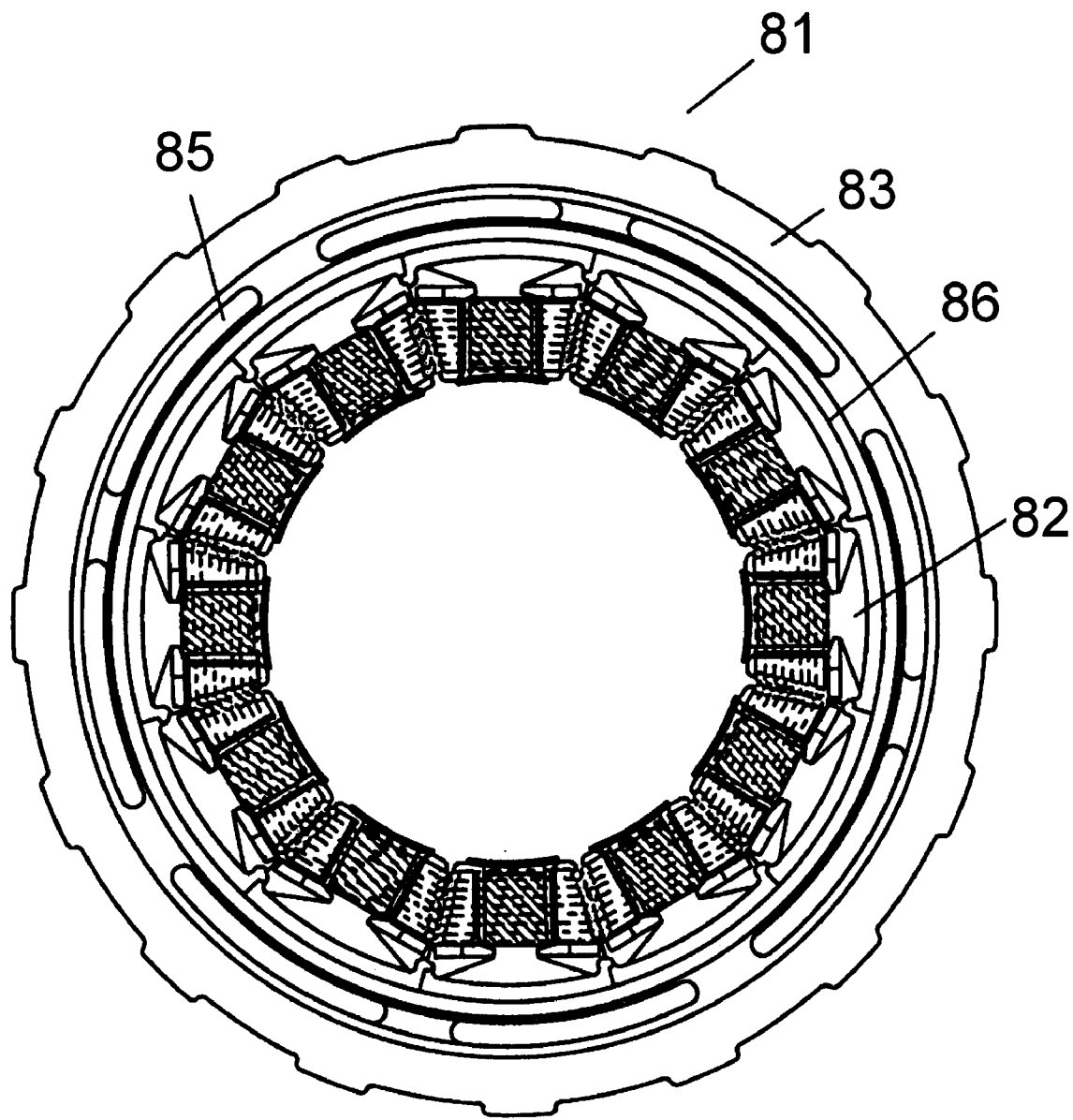
FIG. 18 is a cross section illustrating a stator in accordance with a sixth exemplary embodiment of the present invention.
Figure 19:
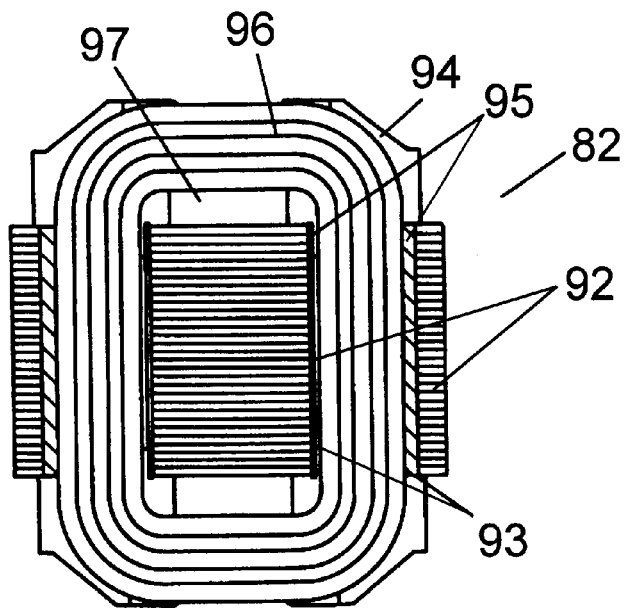
FIG. 19 shows the stator members shown in FIG. 18 viewed from the teeth side.
Figure 20:
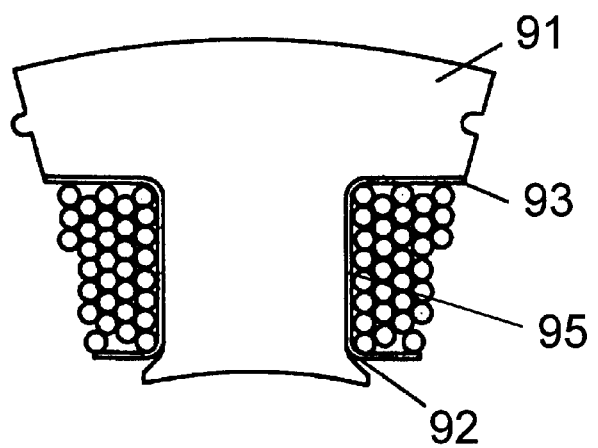
FIG. 20 is a partial cross section illustrating the stator members shown in FIG. 18.

FIG. 18 is a cross section illustrating a stator in accordance with the sixth exemplary embodiment of the present invention. FIG. 19 shows the stator members shown in FIG. 18 viewed from the teeth side. FIG. 20 is a partial cross section illustrating the stator members shown in FIG. 18.

In FIG. 18, stator 81 is reinforced by motor frame 83 from the outside after stator members 82 are assembled into an annular shape. At this time, heat-conductive resin 86 is disposed between frame 83 and stator members 82. Resin 86 is preferably an insulator; but it may as well be conductor. For instance, resin 86 is grease-like rubber functioning as grease at a room temperature. This resin is applied to the outer wall of annularly combined stator members 82, then an inner wall of frame 83 is fitted to the outer wall. As such, resin 86 is disposed between stator members 82 and frame 83, so that the heat from stator members 82 travels to frame 83 with ease. As a result, heat dissipation of stator 81 is improved. Frame 83 is equipped with circulatory path 85 which carries cooling liquid or cooling gas, and this structure air-cools or liquid-cools the frame outside the motor without cooling directly inside the motor. This structure allows the motor not to increase the weight and dissipate the heat efficiently in a simple structure. As a result, this structure can provide a stator with concentrated winding, which increases the output rating and achieves a long service life of a high-performance motor.

Further in stator members 82 in accordance with the sixth embodiment, highly heat-conductive insulating sheet 93 covers laminated face 92 of the slots of core segment 91 as shown in FIGS. 19 and 20. Sheet 93 contacts with laminated face 92, and when insulator 94 fits to core segment 91, sheet 93 is arranged to exist between laminated face 92 and guide section 95 of insulator 94. Then wire is wound on insulator 94, thereby forming coil 96. Coil 96 contacts with core segment 91 via highly heat-conductive insulating resin 97 as well as sheet 93, so that the heat generated by coil 96 can travels to core segment 91 with ease. Further, the heat from core segment 91 travels to frame 83 for heat dissipation.

Sheet 93 is preferably elastic because the elasticity helps coil 96 adhere to core segment 91 more fitly. Further, sheet 93 is preferably formed of a highly elastic rubber-like high heat-conductive-layer and a strong supporting layer, and the heat-conductive-layer faces coil 96. This construction allows sheet 93 to adhere to the coil section more fitly, and sheet 93 has a given strength. Stator 81 thus can be assembled with ease.

As discussed above, the present invention proves that a motor can be cooled efficiently by disposing highly heat-conductive insulating resin or highly heat-conductive insulating sheet between a core segment and a coil, because these materials help the heat generated by the coil travel to the core segment. As a result, continuous output rating is improved, and a motor of high performance with a long service life can be realized. The present invention is applicable not only to the motor but also to the generator.

What is claimed is:

1. A motor with a stator formed by assembling stator members into an annular shape, said stator members comprising:
    (a) a core segment made of laminated electromagnetic steel sheets;
    (b) an electrical insulator covering said core segment; and
    (c) a coil wound on a tooth of said core segment via said insulator;
    wherein at least a part of said insulator contacting with said coil is made of highly heat-conductive insulating resin;
    wherein said insulator is made of hard insulating resin having tensile strength not less than 40 Mpa;
    wherein said highly heat-conductive insulating resin has heat conductivity of not less than 1 W/mK; and
    wherein said hard insulating resin comprises a polyphenylene sulfide resin.

2. A motor with a stator formed by assembling stator members into an annular shape, said stator members comprising:
    (a) a core segment made of laminated electromagnetic steel sheets:
    (b) an electrical insulator covering said core segment; and
    (c) a coil wound on a tooth of said core segment via said insulator;
    wherein at least a part of said insulator contacting with said coil is made of highly heat-conductive insulating resin;
    wherein said insulator includes the highly heat-conductive insulating resin and an insulator body having a hole to be disposed by the highly heat-conductive insulating resin; and wherein the highly heat-conductive insulating resin has higher conductivity than the insulator body.

3. The motor as defined in claim 2, wherein at least a part of the highly heat-conductive insulating resin is exposed to outside of said insulator, and the highly heat-conductive insulating resin are held between the insulator body and said core segment.

4. A motor with a stator formed by assembling stator members into an annular shape, said stator members comprising:
  (a) a core segment made of laminated electromagnetic steel sheets:
  (b) an electrical insulator covering said core segment; and
  (c) a coil wound on a tooth of said core segment via said insulator;
  wherein at least a part of said insulator contacting with said coil is made of highly heat-conductive insulating resin; and
  wherein at least an edge of a tooth of said insulator is formed of hard insulating resin that is harder than the highly heat-conductive insulating resin.

* * * * *